United States Patent
Turcotte et al.

(10) Patent No.: US 9,207,306 B2
(45) Date of Patent: Dec. 8, 2015

(54) LEVEL MEASUREMENT INSTRUMENT FIDUCIAL DETECTION METHOD

(71) Applicant: Magnetrol International, Incorporated, Downers Grove, IL (US)

(72) Inventors: Christopher P. Turcotte, Brookfield, IL (US); Michael J. Linden, Aurora, IL (US)

(73) Assignee: Magnetrol International, Inc., Aurora, IL (US)

( * ) Notice: Subject to any disclaimer, the term of this patent is extended or adjusted under 35 U.S.C. 154(b) by 421 days.

(21) Appl. No.: 13/669,676

(22) Filed: Nov. 6, 2012

(65) Prior Publication Data

US 2014/0125515 A1     May 8, 2014

(51) Int. Cl.
*G01S 13/10* (2006.01)
*G01S 7/292* (2006.01)
*G01F 23/284* (2006.01)

(52) U.S. Cl.
CPC ............. *G01S 7/2922* (2013.01); *G01F 23/284* (2013.01); *G01S 13/10* (2013.01)

(58) Field of Classification Search
CPC ...... G01S 7/2922; G01S 13/10; G01F 23/284
USPC ....................................................... 342/124
See application file for complete search history.

(56) References Cited

U.S. PATENT DOCUMENTS

| | | | |
|---|---|---|---|
| 5,986,602 A * | 11/1999 | Frink | 342/126 |
| 6,531,977 B2 | 3/2003 | McEwan | |
| 7,542,866 B1 * | 6/2009 | Lovegren et al. | 702/107 |
| 8,963,769 B2 * | 2/2015 | Linden et al. | 342/124 |
| 2003/0025626 A1 * | 2/2003 | McEwan | 342/21 |
| 2003/0184336 A1 * | 10/2003 | Kobayashi | 324/765 |
| 2014/0104099 A1 * | 4/2014 | Janitch | 342/124 |
| 2014/0125515 A1 * | 5/2014 | Turcotte et al. | 342/124 |

* cited by examiner

*Primary Examiner* — John B Sotomayor
(74) *Attorney, Agent, or Firm* — Wood, Phillips, Katz, Clark & Mortimer

(57) ABSTRACT

A process measurement instrument includes a fiducial and is adapted for detection of the fiducial. The instrument includes an interface circuit comprising a drive circuit for transmitting a pulse signal at the fiducial and at a target of interest and a receive circuit receiving reflected echoes of the pulse signal and developing an analog receive signal representative of the reflected echoes. A processing circuit is operatively coupled to the interface circuit for receiving the analog receive signal and comprising a threshold detector detecting if the analog receive signal is above a select threshold value. A controller is operatively coupled to the processing circuit and responsive to leading and trailing edges of the reflected echo for the fiducial and determining an average of the leading and trailing edges to determine location of the fiducial.

30 Claims, 5 Drawing Sheets

LEVEL MEASUREMENT INSTRUMENT FIDUCIAL DETECTION METHOD

CROSS-REFERENCE TO RELATED APPLICATIONS

Not Applicable.

FEDERALLY SPONSORED RESEARCH OR DEVELOPMENT

Not Applicable.

MICROFICHE/COPYRIGHT REFERENCE

Not Applicable.

FIELD OF THE INVENTION

This invention relates to process control instruments, and more particularly, to a level measurement instrument using an improved fiducial detection method.

BACKGROUND

Process control systems require the accurate measurement of process variables. Typically, a primary element senses the value of a process variable and a transmitter develops an output having a value that varies as a function of the process variable. For example, a level transmitter includes a primary element for sensing level and a circuit for developing an electrical signal proportional to sensed level.

Knowledge of level in industrial process tanks or vessels has long been required for safe and cost-effective operation of plants. Many technologies exist for making level measurements. These include buoyancy, capacitance, ultrasonic and microwave radar, to name a few. Some level measurement instruments measure the distance from a known location to a material surface. Particularly, distance measuring devices including those employing guided wave radar and through air radar technology often make use of a reference signal, referred to as a fiducial. The fiducial is a known location, typically in the instrument housing or at the top of a probe or antenna. The location of the fiducial must be determined accurately in order for the distance measurement to be accurate. The distance to the surface of interest is determined by the apparent difference in time of signals between the fiducial and the surface of interest.

Such technologies make use of an interface circuit comprising a drive circuit for transmitting a pulse signal at the fiducial and at the target of interest and a receive circuit to receive reflected echoes of the pulse signal. The typical echo for the fiducial signal is a pulse. The fiducial location is typically determined using a comparator that detects the leading edge of the fiducial echo signal at the point where it exceeds a predetermined threshold value. However, the edges of the fiducial signal are sloped. Changes in signal amplitude can occur due to drifting, electronic component characteristics, or temperature induced changes to the device's mechanical properties. Such changes in signal amplitude can result in an apparent change of the fiducial location. This is generally illustrated in FIG. 3. This will introduce measurement error.

The present invention is directed to solving one or more of the problems discussed above in a novel and simple manner.

SUMMARY

As described herein, a measurement instrument determines location of a center of a reflected echo in order to determine location of a fiducial, or other signal.

Broadly, there is disclosed herein a process measurement instrument including a fiducial and adapted for detection of the fiducial. The instrument includes an interface circuit comprising a drive circuit for transmitting a pulse signal at the fiducial and at a target of interest and a receive circuit receiving reflected echoes of the pulse signal and developing an analog receive signal representative of the reflected echoes. A processing circuit is operatively coupled to the interface circuit for receiving the analog receive signal and comprising a threshold detector detecting if the analog receive signal is above a select threshold value. A controller is operatively coupled to the processing circuit and responsive to leading and trailing edges of the reflected echo for the fiducial and determining an average of the leading and trailing edges to determine location of the fiducial.

It is a feature that the interface circuit is operatively coupled to a probe defining a transmission line.

It is another feature of the invention that the interface circuit is operatively coupled to an antenna.

It is another feature that the controller comprises a programmed processor.

It is still a further feature that the select threshold value is determined by the programmed processor.

It is yet another feature that the leading and trailing edges are determined by the analog receive signal being greater than and subsequently less than the select threshold value during a fiducial detection time window.

There is disclosed in accordance with another aspect of the invention a process measurement instrument including a fiducial and adapted for detection of the fiducial comprising an interface circuit. The interface circuit comprises a drive circuit for transmitting a pulse signal at the fiducial and at a target of interest and a receive circuit receiving reflected echoes of the pulse signal and developing an analog receive signal representative of the reflected echoes. A processing circuit is operatively coupled at the interface circuit for receiving the analog receive signal and comprising a threshold detector detecting if the analog receive signal is above a select threshold value. A controller is operatively coupled to the processing circuit and is responsive to the reflected echo for the fiducial to determine location of a center of the reflected echo for the fiducial to determine location of the fiducial.

It is a feature that the controller determines leading and trailing edges of the reflected echo for the fiducial responsive to the analog receive signal being greater than and subsequently less than the select threshold value during a fiducial detection time window. The location of the center of the reflected echo for the fiducial comprises an average of the leading and trailing edges.

There is disclosed in accordance with yet another embodiment a method of detecting location of a fiducial for a level measurement instrument comprising providing an interface circuit comprising a drive circuit for transmitting a pulse signal at the fiducial and at a target of interest and a receive circuit receiving reflected echoes of the pulse signal and developing an analog receive signal representative of the reflected echoes; providing a processing circuit operatively coupled to the sensor circuit for receiving the analog receive signal and detecting if the analog receive signal is above a select threshold value; and providing a controller operatively coupled to the processing circuit and responsive to leading and trailing edges of the reflected echo for the fiducial to determine location of the fiducial.

Other features and advantages will be apparent from a review of the entire specification, including the appended claims and drawings.

DETAILED DESCRIPTION

Figure 1:
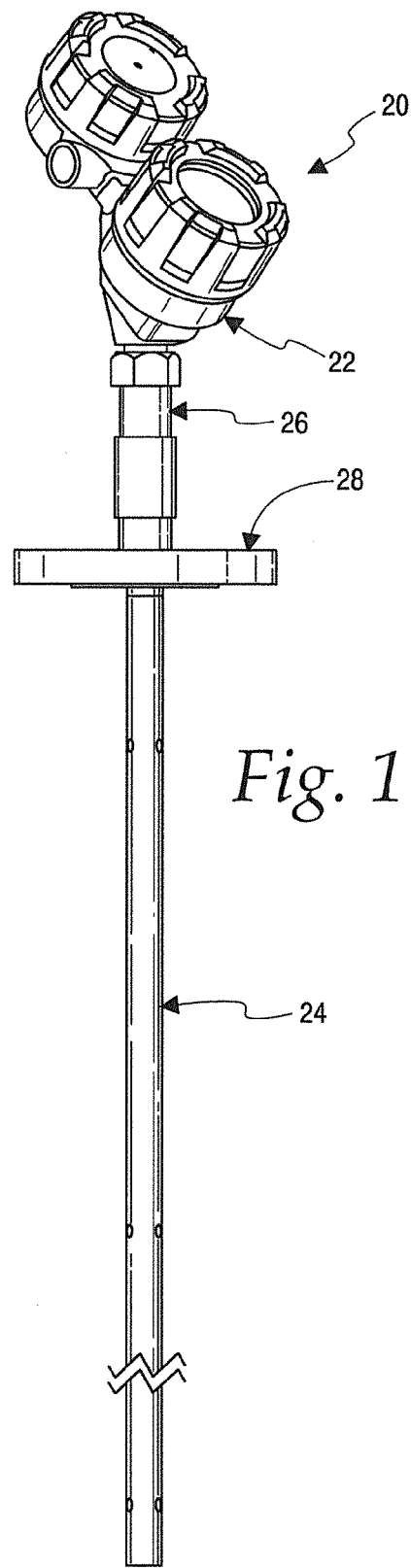
FIG. 1 is an elevation view of a guided wave radar instrument with fiducial detection in accordance with the invention.

Referring to FIG. 1, a process instrument 20 is illustrated. The process instrument 20 uses pulsed radar in conjunction with equivalent time sampling (ETS) and ultra-wide band (UWB) transceivers for measuring level using time domain reflectometry (TDR). Particularly, the instrument 20 uses guided wave radar for sensing level. While the embodiment described herein relates to a guided wave radar level sensing apparatus, various aspects of the invention may be used with other types of process instruments for measuring various process parameters such as, for example, through air radar.

The process instrument 20 includes a control housing 22, a probe 24, and a connector 26 for connecting the probe 24 to the housing 22. The probe 24 is adapted for mounting a process vessel using a flange 28. The housing 22 is then secured to the probe 24 as by threading the connector 26 to the probe 24 and also to the housing 22. The probe 24 comprises a high frequency transmission line which, when placed in a fluid, can be used to measure level of the fluid. Particularly, the probe 24 is controlled by a controller 30, described below, in the housing 22 for determining level in the vessel.

As described more particularly below, the controller 30 generates and transmits pulses on the probe 24. A reflected signal is developed off any impedance changes, such as the liquid surface of the material being measured. A small amount of energy may continue down the probe 24. The probe 24 typically includes a fiducial comprising an impedance change at a known location, such as at the connector 26 to the probe 24. The controller 30 is operable to determine the time distance of reflected echoes from the fiducial to the liquid surface, being the surface of interest, to determine level.

While the embodiment described herein relates to a guided wave radar instrument, the principles used could be applied to other instruments, such as through air radar technology. With through air radar the probe is actually an antenna spaced from the surface of interest, as is known. The fiducial is created from measuring the impedance mismatch of the electronic circuitry's launcher to the antenna and the antenna itself. The use of a fiducial for generating a reference signal is known in connection with level measurement. The present invention is not directed to the use of a fiducial per se, but rather to an improved methodology for detecting the location of the fiducial.

Guided wave radar, and similarly pulse burst radar for through air measurement, combines TDR, ETS and low power circuitry. TDR uses pulses of electromagnetic (EM) energy to measure distanced or levels. When a pulse reaches a dielectric discontinuity then a part of the energy is reflected. The greater the dielectric difference, the greater the amplitude of the reflection. In the measurement instrument 20, the probe 24 comprises a transmission line with a characteristic impedance in air. When part of the probe 24 is immersed in a material other than air, there is lower impedance due to the increase in the dielectric. When the EM pulse is sent down the probe, it meets the dielectric discontinuity and a reflection is generated.

ETS is used to measure the high speed, low power EM energy. The high speed EM energy (1000 feet/microsecond) is difficult to measure over short distances and at the resolution required in the process industry. ETS captures the EM signals in real time (nanoseconds) and reconstructs them in equivalent time (milliseconds), which is much easier to measure. ETS is accomplished by scanning the transmission line to collect thousands of samples. Approximately five scans are taken per second.

Figure 2:
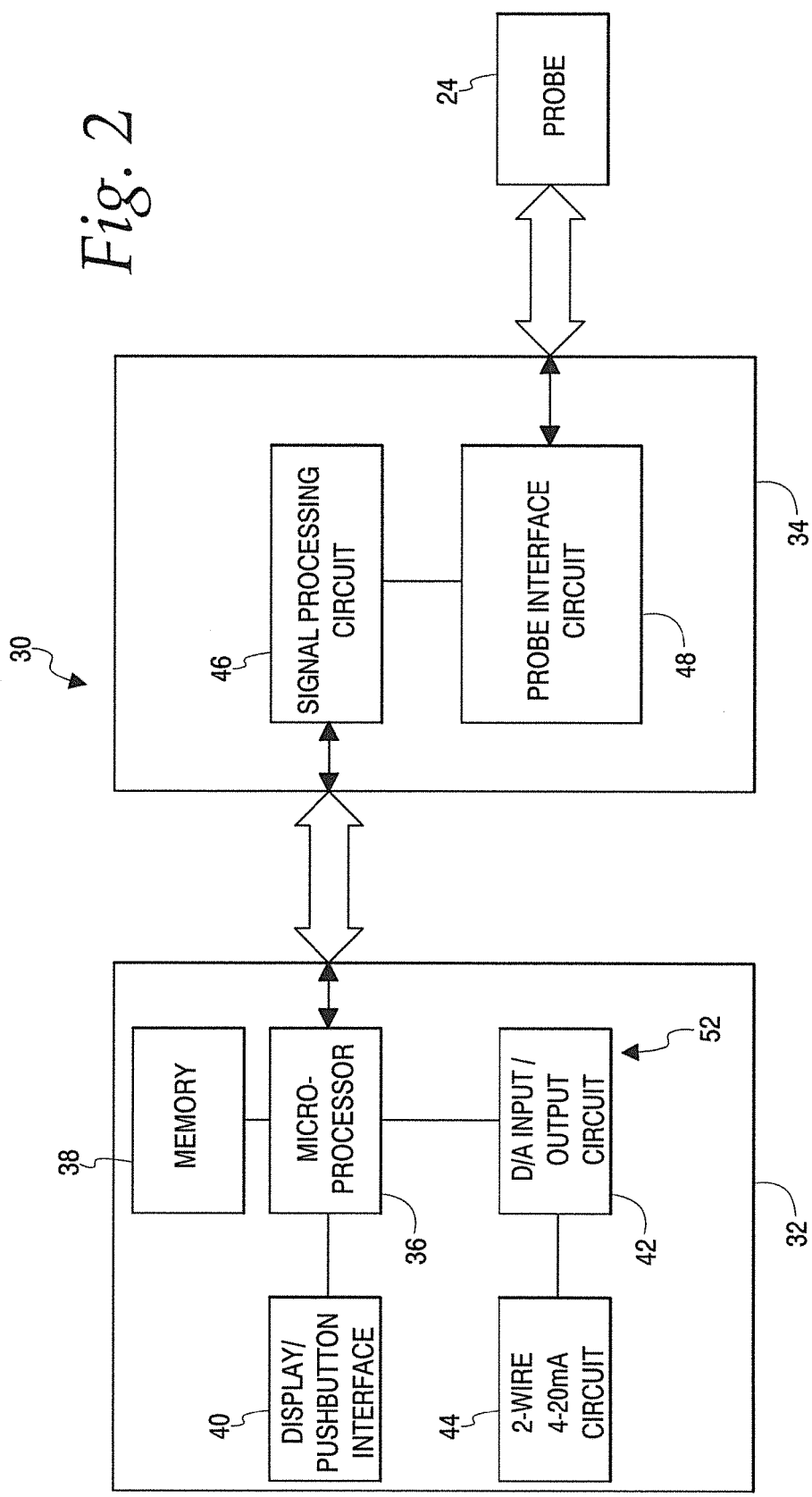
FIG. 2 is a block diagram of the instrument of FIG. 1.

Referring to FIG. 2, the electronic circuitry mounted in the housing 22 of FIG. 1 is illustrated in block diagram form as an exemplary controller 30 connected to the probe 24. As will be apparent, the probe 24 could be used with other controller designs. The controller 30 includes a digital circuit 32 and an analog circuit 34. The digital circuit 32 includes a microprocessor 36 connected to a suitable memory 38 (the combination forming a computer) and a display/push button interface 40. The display/push button interface 40 is used for entering parameters with a keypad and displaying user and status information. The memory 38 comprises both non-volatile memory for storing programs and calibration parameters, as well as volatile memory used during level measurement. The microprocessor 36 is also connected to a digital to analog input/output circuit 42 which is in turn connected to a two-wire circuit 44 for connecting to a remote power source. Particularly, the two-wire circuit 44 utilizes loop control and power circuitry which is well known and commonly used in process instrumentation. The two-wire circuit 44 controls the current on the two-wire line in the range of 4-20 mA which represents level or other characteristics measured by the probe 24. The two-wire circuit 44 also supports digital communications such as HART, which is well known.

The microprocessor 36 is also connected to a signal processing circuit 46 of the analog circuit 34. The signal processing circuit 46 is in turn connected via a probe interface circuit 48 to the probe 24. The probe interface circuit 48 includes an ETS circuit which converts real time signals to equivalent time signals, as discussed above. The signal processing circuit 46 processes the ETS signals and provides a timed output to the microprocessor 36, as described more particularly below.

The general concept implemented by the ETS circuit is known. The probe interface circuit 48 generates hundreds of thousands of very fast pulses of 500 picoseconds or less rise time every second. The timing between pulses is tightly controlled. The reflected pulses are sampled at controlled intervals. The samples build a time multiplied "picture" of the reflected pulses. Since these pulses travel on the probe 24 at the speed of light, this picture represents approximately ten nanoseconds in real time for a five-foot probe. The probe interface circuit 48 converts the time to about seventy-one milliseconds. As is apparent, the exact time would depend on various factors, such as, for example, probe length. The largest signals have an amplitude on the order of twenty millivolts before amplification to the desired amplitude by common audio amplifiers. For a low power device, a threshold scheme is employed to give interrupts to the microprocessor 36 for select signals, namely, fiducial, reference target, level and other targets of interest, and end of probe, as described below. The microprocessor 36 converts these timed interrupts into distance. With the probe length entered through the display/push button interface 40, or some other interface, the microprocessor 36 can calculate the level by subtracting from the probe length the difference between the fiducial and level distances. Changes in measured location of the reference target can be used for velocity compensation, as necessary or desired.

Figure 3:
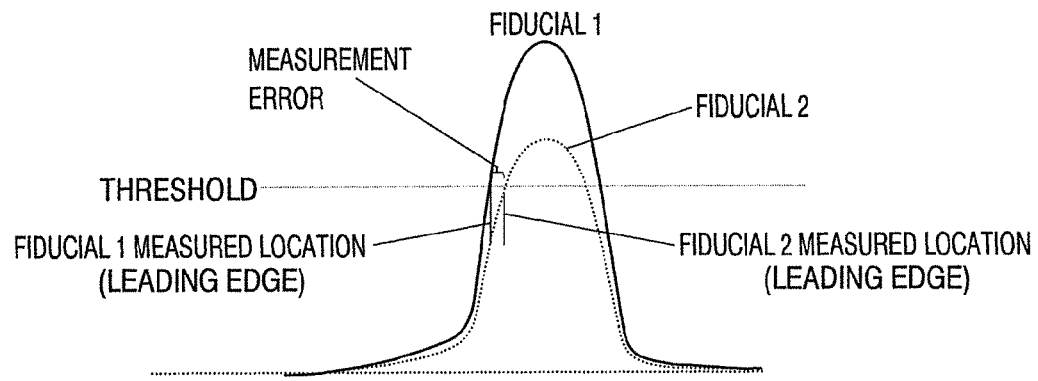
FIG. 3 is a curve illustrating single edge fiducial detection.

As discussed, in order to perform level measurement or more generally distance measurement, using reflected echo signals, it is necessary to determine the precise position of the fiducial. This is conventionally done using single edge fiducial detection, illustrated in FIG. 3. With single edge fiducial detection, using a fixed threshold voltage, the measured location can change depending on the signal amplitude. This is because the edges of the fiducial signal are sloped. These changes in signal amplitude can therefore introduce a measurement error by making the fiducial appear to be at a different location than it actually is.

Figure 4:
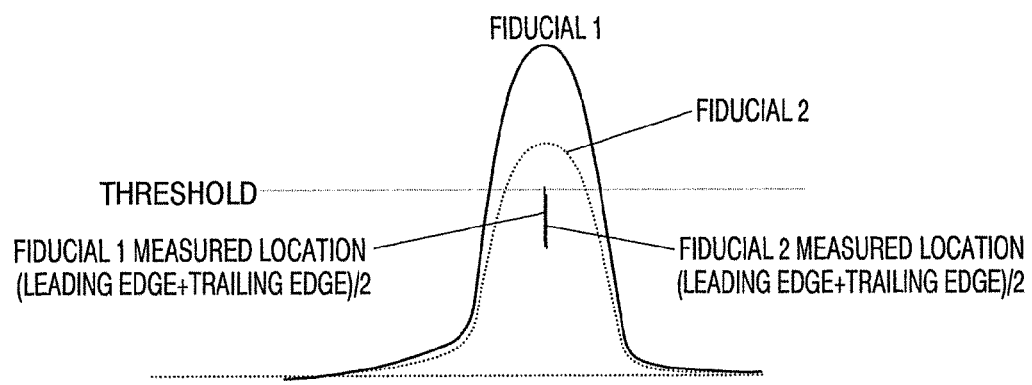
FIG. 4 is a curve illustrating dual edge fiducial detection in accordance with the invention.

In accordance with the invention, the controller 30 does not rely solely on the leading edge of the fiducial. Instead, the controller 30 detects the leading edge and trailing edge of the fiducial pulse. The fiducial location is determined by averaging the leading and trailing edges. As shown in FIG. 4, any resulting measurement error is virtually eliminated. The more symmetrical the fiducial pulse, the smaller the resulting measurement error. As such, this methodology effectively determines the location of the center of the fiducial echo signal to virtually eliminate apparent fiducial shifts that occur due to signal amplitude changes using only the leading edge, as shown.

Figure 5:
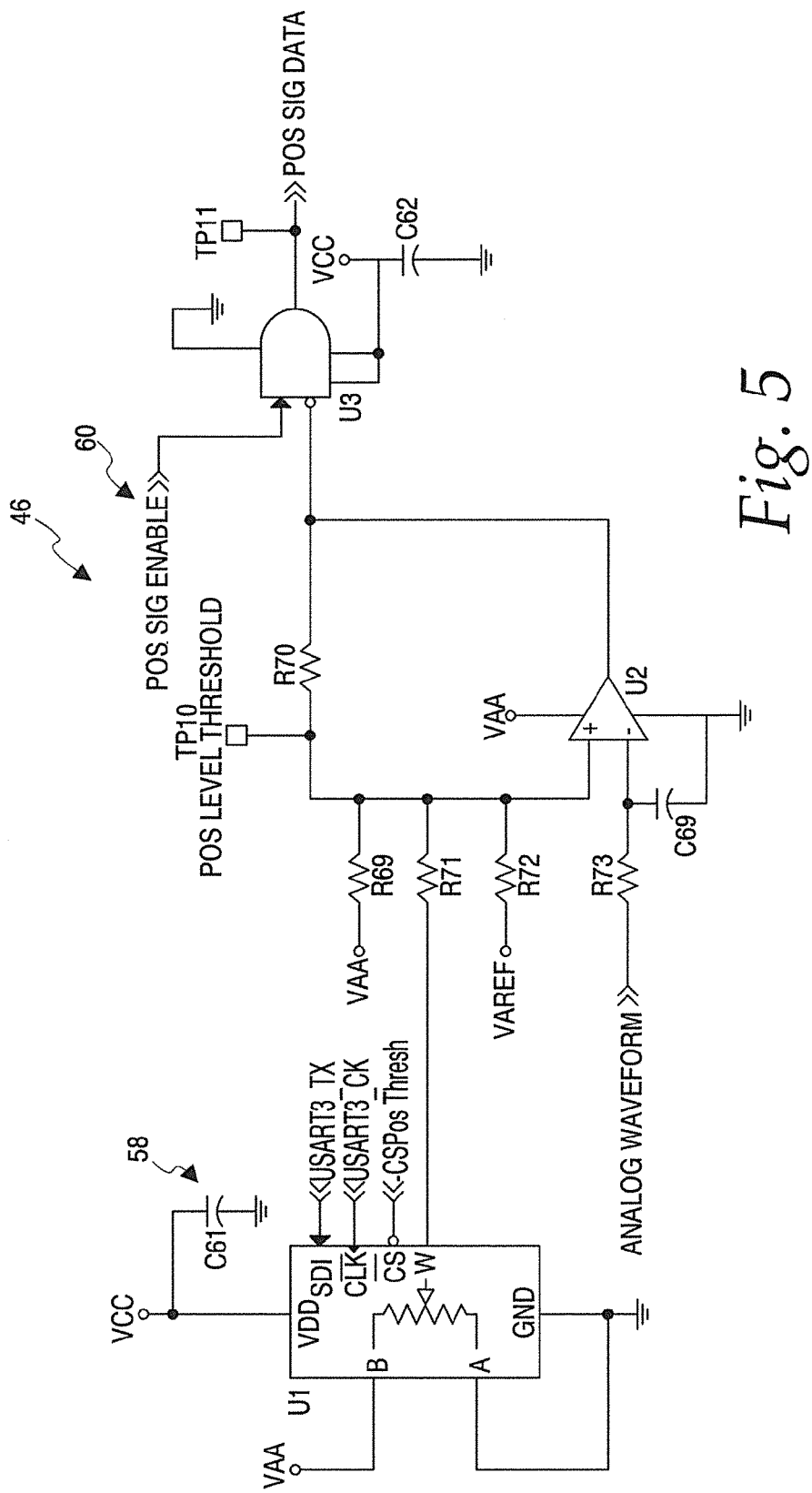
FIG. 5 is an electrical schematic for a signal processing circuit for detecting leading and trailing edges of echo pulses.

Referring to FIG. 5, a portion of the signal processing circuit 46 is illustrated which is operable to acquire the leading edge and trailing edge times of the fiducial echo signal. The signal processing circuit 46 comprises a programmable threshold circuit 58 and a positive signal detector circuit 60. Although not shown, a negative signal detector circuit is used to detect negative polarity reflected echoes. The threshold circuit 58 uses a digital potentiometer U1. The digital potentiometer U1 may be, for example, a type AD5160 256 position digital potentiometer. The digital potentiometer U1 receives a serial data input from the microprocessor 36 to generate a select threshold value output at a terminal W to the positive signal detector circuit 60. Thus, the select threshold value is determined by the microprocessor 36, as discussed below.

The positive signal detector circuit 60 includes a comparator U2. The non-inverted input receives the threshold value from the digital potentiometer U1. The inverted input receives an analog waveform, comprising the analog receive signal representative of the reflected echoes, from the probe interface circuit 48. The output of the comparator U2 is provided to a gate circuit U3 which also receives a positive signal enable signal from the microprocessor 36. The output of the gate U3 comprises positive signal data output to the microprocessor 36. Particularly, the positive signal value is high if the gate U3 is enabled and if the pulse echo has a signal level greater than the select threshold value.

More particularly, the signal processing circuit 46 uses the positive signal detector circuit 60 along with the programmable threshold circuit 58 to acquire the leading and trailing edges of the fiducial signal which are output to the microprocessor 36. The microprocessor 36 functions as a timer to accurately capture the times of the leading and trailing edges of the fiducial where the fiducial rises above and falls below the associated positive signal threshold.

The microprocessor 36 is programmed to set the positive signal threshold value to the digital potentiometer U1 specific to fiducial acquisition. Programming in the microprocessor 36 configures a timer function to capture the leading edge of the fiducial signal. Particularly, the hardware positive signal data channel enable is set just before a "fiducial window". The fiducial window is a time region where the microprocessor 36 expects to see a valid fiducial signal. When the leading edge of the fiducial echo crosses the threshold, the comparator U2 triggers an interrupt routine to save the time in the microprocessor 36. The microprocessor timer is then reconfigured to capture the trailing edge of the fiducial. Particularly, when the trailing edge of the fiducial crosses the threshold, the comparator U2 triggers the microprocessor timer that captures the trailing edge time and triggers an interrupt service routine to save the time. These time values are measured in ticks, as is known. The associated microprocessor timer is disabled and the hardware positive signal data channel enable is cleared. The microprocessor 36 then calculates the fiducial ticks as the average of the leading and trailing edge ticks that were acquired. If the fiducial signal is not in the fiducial window, a diagnostic is activated indicating "no fiducial".

Figure 6:
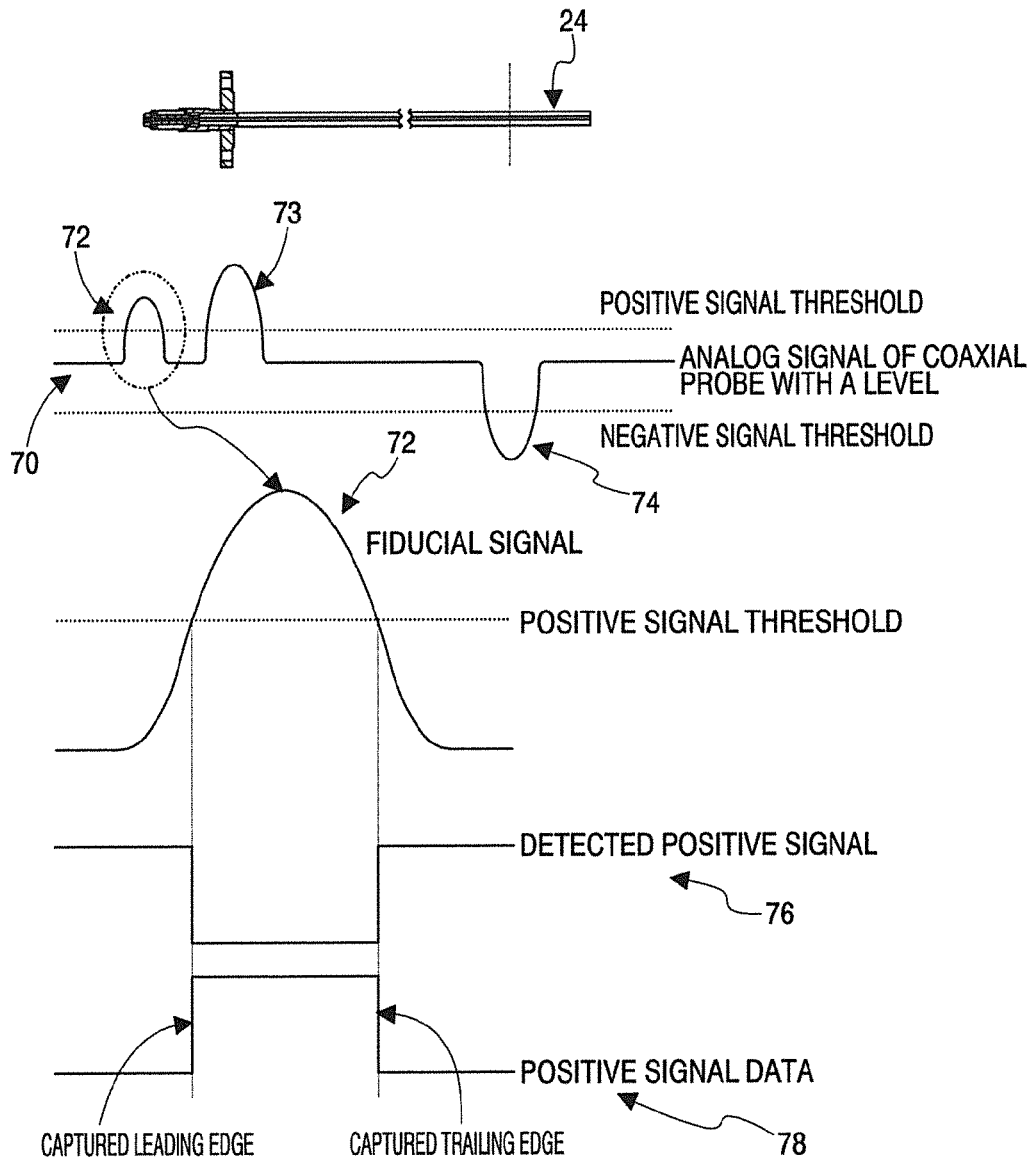
FIG. 6 is a timing diagram illustrating curves associated with the probe of FIG. 1.

This operation is generally illustrated in FIG. 6 which shows the probe 24 aligned with an exemplary analog receive signal 70 representative of the reflected echoes. The analog receive signal 70 includes a positive fiducial echo 72 at the connector location, a positive fiducial echo 73 at a reference target, and a negative level echo 74 at the liquid level surface. As shown, the microprocessor 36 uses a positive signal threshold for measuring positive polarity pulses and a negative signal threshold for measuring negative polarity pulses. It is well known that the circuitry can be designed such that the analog receive signal can be inverted. In that case, the fiducial echo pulse would be negative, requiring a negative signal threshold, and the level echo would be positive, requiring a positive signal threshold.

The analog waveform for the fiducial echo 72 is shown in expanded form alongside the positive signal threshold generated by the microprocessor 36. The detected positive signal output from the comparator U2 is shown at 76 which is converted to positive signal data 78, representing the output of the gate U3, with the curve 78. The signal 78 is used by the microprocessor 36 to determine the leading edge and trailing edge, as shown.

Thus, in accordance with the invention, the microprocessor 36 and signal processing circuit 46 are responsive to leading and trailing edges of the reflected echo for the fiducial to determine location of a center of the reflected echo for the fiducial responsive to an average of the leading and trailing edge of the reflected echo. As will be apparent, the microprocessor 36 and signal processing circuit 46 can likewise be responsive to leading and trailing edges of the reflected echo for any of the reference target, level and other targets of interest, and end of probe.

As is apparent, the functionality of the threshold circuit 58 and the detector circuit 60, as well as other analog circuits, could be implemented in the microprocessor 36, or any combination thereof. Accordingly, the illustrations support combinations of means for performing a specified function and combinations of steps for performing the specified functions. It will also be understood that each block and combination of blocks can be implemented by special purpose hardware-based systems which perform the specified functions or steps, or combinations of special purpose hardware and computer instructions.

It will be appreciated by those skilled in the art that there are many possible modifications to be made to the specific forms of the features and components of the disclosed embodiments while keeping within the spirit of the concepts disclosed herein. Accordingly, no limitations to the specific forms of the embodiments disclosed herein should be read into the claims unless expressly recited in the claims.

Although a few embodiments have been described in detail above, other modifications are possible. Other embodiments may be within the scope of the following claims.

The invention claimed is:

1. A process measurement instrument including a fiducial and adapted for detection of the fiducial comprising:
an interface circuit comprising a drive circuit for transmitting a pulse signal at the fiducial and at a target of interest and a receive circuit receiving reflected echoes of the pulse signal and developing an analog receive signal representative of the reflected echoes;
a processing circuit operatively coupled to the interface circuit for receiving the analog receive signal and comprising a threshold detector detecting if the analog receive signal is above a select threshold value; and
a controller operatively coupled to the processing circuit and responsive to leading and trailing edges of the reflected echo for the fiducial and determining an average of the leading and trailing edges to determine location of the fiducial.

2. The process measurement instrument of claim 1 wherein the interface circuit is operatively coupled to a probe defining a transmission line.

3. The process measurement instrument of claim 1 wherein the interface circuit is operatively coupled to a probe defining an antenna.

4. The process measurement instrument of claim 1 wherein the controller comprises a programmed processor.

5. The process measurement instrument of claim 4 wherein the select threshold value is determined by the programmed processor.

6. The process measurement instrument of claim 1 wherein the leading and trailing edges are determined by the analog receive signal being greater than and subsequently less than the select threshold value during a fiducial detection time window.

7. The process measurement instrument of claim 1 wherein the controller determines if the fiducial echo is not received in a receive window and responsive thereto indicates a no fiducial diagnostic.

8. The process measurement instrument of claim 1 wherein the controller is responsive to leading and trailing edges of a reflected echo for a reference target and determining an average of the leading and trailing edges to determine location of the reference target.

9. The process measurement instrument of claim 1 wherein the controller is responsive to leading and trailing edges of a reflected echo for an end of a probe and determining an average of the leading and trailing edges to determine location of the end of the probe.

10. The process measurement instrument of claim 1 wherein the controller is responsive to leading and trailing edges of a reflected echo for the target of interest and determining an average of the leading and trailing edges to determine location of the target of interest.

11. A process measurement instrument including a fiducial and adapted for detection of the fiducial comprising:
an interface circuit comprising a drive circuit for transmitting a pulse signal at the fiducial and at a target of interest and a receive circuit receiving reflected echoes of the pulse signal and developing an analog receive signal representative of the reflected echoes;
a processing circuit operatively coupled to the interface circuit for receiving the analog receive signal and comprising a threshold detector detecting if the analog receive signal is above a select threshold value; and
a controller operatively coupled to the processing circuit and responsive to the reflected echo for the fiducial to determine location of a center of the reflected echo for the fiducial to determine location of the fiducial.

12. The process measurement instrument of claim 11 wherein the interface circuit is operatively coupled to a probe defining a transmission line.

13. The process measurement instrument of claim 11 wherein the interface circuit is operatively coupled to a probe defining an antenna.

14. The process measurement instrument of claim 11 wherein the controller comprises a programmed processor.

15. The process measurement instrument of claim 14 wherein the select threshold value is determined by the programmed processor.

16. The process measurement instrument of claim 11 wherein the controller determines leading and trailing edges of the reflected echo for the fiducial responsive to the analog receive signal being greater than and subsequently less than the select threshold value during a fiducial detection time window.

17. The process measurement instrument of claim 16 wherein the location of the center of the reflected echo for the fiducial comprises an average of the leading and trailing edges.

18. The process measurement instrument of claim 11 wherein the controller determines if the fiducial echo is not received in a receive window and responsive thereto indicates a no fiducial diagnostic.

19. The process measurement instrument of claim 11 wherein the controller is responsive to leading and trailing edges of a reflected echo for a reference target and determining an average of the leading and trailing edges to determine location of the reference target.

20. The process measurement instrument of claim 11 wherein the controller is responsive to leading and trailing edges of a reflected echo for an end of a probe and determining an average of the leading and trailing edges to determine location of the end of the probe.

21. The process measurement instrument of claim 11 wherein the controller is responsive to leading and trailing edges of a reflected echo for the target of interest and determining an average of the leading and trailing edges to determine location of the target of interest.

22. A method of detecting location of a fiducial for a level measurement instrument comprising:
providing an interface circuit comprising a drive circuit for transmitting a pulse signal at the fiducial and at a target of interest and a receive circuit receiving reflected echoes of the pulse signal and developing an analog receive signal representative of the reflected echoes;
providing a processing circuit operatively coupled to the sensor circuit for receiving the analog receive signal and detecting if the analog receive signal is above a select value; and
providing a controller operatively coupled to the processing circuit and responsive to leading and trailing edges of the reflected echo for the fiducial to determine location of the fiducial.

23. The method of claim 22 wherein the wherein the select value is determined by the controller.

24. The method of claim 22 wherein the controller determines leading and trailing edges of the reflected echo for the fiducial responsive to the analog receive signal being greater than and subsequently less than the select value during a fiducial detection time window.

25. The method of claim 22 wherein the controller determines an average of the leading and trailing edges representing location of a center of the reflected echo for the fiducial.

26. The method of claim 22 further comprising determining if the fiducial echo is not received in a receive window and responsive thereto indicating a no fiducial diagnostic.

27. The method of claim 22 wherein the controller is responsive to leading and trailing edges of a reflected echo for a reference target and determining an average of the leading and trailing edges to determine location of the reference target.

28. The method of claim 22 wherein the controller is responsive to leading and trailing edges of a reflected echo for an end of a probe and determining an average of the leading and trailing edges to determine location of the end of the probe.

29. The method of claim 22 wherein the controller is responsive to leading and trailing edges of a reflected echo for the target of interest and determining an average of the leading and trailing edges to determine location of the target of interest.

30. The method of claim 22 wherein the controller is responsive to leading and trailing edges of a reflected echo for a level surface and determining an average of the leading and trailing edges to determine location of the level surface.

* * * * *